3,400,450
METHOD OF FORMING FERROUS SHEET FACED WITH ALUMINUM
Joseph A. Nock, Jr., Natrona Heights, and John E. Vruggink, Lower Burrell, Pa., assignors to Aluminum Company of America, Pittsburgh, Pa., a corporation of Pennsylvania
No Drawing. Continuation-in-part of application Ser. No. 192,043, May 3, 1962. This application Nov. 10, 1965, Ser. No. 507,237
4 Claims. (Cl. 29—497.5)

ABSTRACT OF THE DISCLOSURE

A laminate composite consisting of a ferrous sheet layer faced with an aluminum base alloy sheet layer containing aluminum and between 0.4 and 10% magnesium is produced by interdisposing between these two layers a third layer of magnesium-free aluminum. The composite is formed by hot rolling and the intermediate layer overcomes the impaired bondability to a ferrous base of aluminum alloys containing magnesium.

---

This is a continuation-in-part of application Ser. No. 192,043, filed May 3, 1962, and now abandoned.

This invention relates to laminates comprising ferrous material faced with aluminous material, and relates particularly to the production of such laminates in which ferrous sheet is faced with an aluminum base alloy containing magnesium.

Laminates composed of a layer of ferrous sheet faced with aluminum or an aluminum base alloy are well known, and their production by assembling a composite consisting of ferrous sheet and a sheet or slab of aluminous material, and hot rolling the composite to bond the layers directly to each other, is described in various United States patents, such as Nos. 1,554,097, 2,171,040, 2,484,118, 2,693,121, 2,758,368, 2,782,498 and 2,809,422. Patent 2,171,404 describes particularly effective procedures for the direct bonding of stainless steel sheet to aluminum sheet by hot rolling the two materials at 600–900° F., and subsequently heating the resultant laminate at 600–900° F. to strengthen the bond between the two layers.

For some purposes it is desirable to face ferrous sheet with one of the readily workable aluminum base alloys containing at least 85% of aluminum, and 0.4–10% of magnesium, with or without other alloying elements and incidental impurities. Commercial aluminum base alloys of that type are well known; for example, Numbers 2024, 2218, 3004, 4032, 5005, 5050, 5052, 5056, 5083, 5086, 5154, 5155, 5357, 5454, 5456, 5457, 6053, 6061, 6062, 6066, 7075, 7079, 7178 and 7277. The composition of the latter alloys is described on page 917 of Metals Handbook, 8th edition, vol. 1, published by American Society for Metals.

However, workable aluminum base alloys containing over 0.4% of magnesium do not bond readily to ferrous sheet by hot rolling the two materials together, and particular difficulty is encountered in securing a bond which is strong enough to withstand subsequent working operations on the laminate. Apparently the difficulty in obtaining a satisfactory bond is caused by the fact that aluminum base alloys which contain over 0.4% of magnesium acquire a particularly thick oxide film on their surface, especially when heated in contact with air, which film interferes with establishing a metal-to-metal contact between the aluminum alloy and the ferrous sheet. Securing a good bond is particularly difficult when the amount of roll pressure applied in the hot-rolling operation results in little or no working of the ferrous sheet, as is sometimes desirable in the interest of minimizing the amount of strain imposed on the bond between the two layers in subsequent work-forming operations on the laminate.

It is an object of this invention to provide improved laminates of ferrous sheet faced with a wrought aluminum base alloy containing magnesium, and also to provide an improved procedure for producing such laminates.

U.S. Patent 2,937,435 discloses a clad sheet body comprising ferrous and aluminous sheets bonded together with a third layer intermediate the two. This intermediate layer contains 0.5 to 2% silicon to minimize the formation of the brittle iron-aluminide layer often encountered in iron-aluminum composites, especially where such are heated over 1000° F. as in annealing. The present invention is based on the discovery that a roll bonded composite of an aluminum sheet containing 0.4 to 10% magnesium and a ferrous sheet can be provided if there is disposed between the aforesaid ferrous and aluminous sheets an intermediate layer containing less than 0.5% silicon, for instance 0.4% or less, and substantially no magnesium.

As used herein, the expression "ferrous metal sheet" refers to rolled sheet of iron, carbon steels, alloy steels, and stainless steels; and the expressions "aluminum substantially free of magnesium," and "magnesium-free aluminum," refer to aluminum and aluminum base alloys which contain no magnesium, or in which magnesium is only present as an impurity in amounts less than 0.1%, and not as an intentionally added element. Composition percentages set forth herein are by weight.

In accordance with the invention, unitary laminates consisting of ferrous metal sheet faced with a wrought aluminum base alloy containing at least 85% of aluminum, and 0.4–10% of magnesium, are produced by assembling a composite consisting of a layer of such ferrous sheet and a wrought, laminated sheet or slab consisting of a layer of a workable aluminum base alloy containing at least 85% of aluminum, and 0.4–10% of magnesium, bonded by an integral metallurgical bond to a layer of readily workable aluminum substantially free of magnesium, and containing less than 0.5% silicon, and preferably having an elongation greater than that of the said magesium-containing alloy layer. In the aforesaid assembled composite the magnesium-free aluminum layer is positioned intermediate the ferrous sheet and the layer of magnesium-containing aluminum base alloy. The assembled composite may either be in the form of two individual pieces of finite length, or may consist of two layers of continuous strip.

The magnesium-free aluminum layer may consist of aluminum of commercial purity or better, or may be a workable aluminum base alloy, such as Numbers 1100, 2219, 3003, and 7072 of the aforesaid table on page 917 of Metals Handbook. In commercial practice, these alloys normally contain less than 0.5% silicon and, more often, 0.4% or less. Preferably the aluminous laminate is in the fully annealed, or only partially work-hardened, condition.

The aforesaid assembled composite is hot-rolled at 600–900° F. under sufficient roll pressure to bond the layer of magnesium-free aluminum firmly to the ferrous sheet. Following the aforesaid hot-rolling operation, the laminate is preferably heated at 600–900° F. for a short time, as described in Patent 2,171,040, to strengthen the bond between the ferrous layer and the intermediate layer of the laminate by re-crystallization of the intermediate layer. Prior to assembling the composite to be hot-rolled, it is desirable to roughen one or both of the surfaces to be joined, as by scratch brushing such surfaces.

The aforesaid wrought, laminated aluminous sheet or slab consisting of a layer of a wrought aluminum base alloy containing at least 85% of aluminum, and 0.4–10% of magnesium, and a layer of aluminum which is substantially free of magnesium, can be produced by well-known procedures which consist essentially of placing sheets or slabs of the two materials together, and hot rolling the resultant composite under sufficient roll pressure to effect a substantial reduction in thickness of the two layers, and formation of strong, integral, metallurgical bond between the two layers. When such a duplex material and a separate layer of ferrous metal sheet are placed together and hot-rolled, as described above, the magnesium-free aluminum layer becomes joined to the ferrous sheet more firmly than would be the case in bonding ferrous sheet directly to the magnesium-containing aluminum base alloy under the same conditions. Thus, the presence of the intermediate layer of magnesium-free aluminum, containing less than 0.5% silicon, results in an improved hot-rolled laminate of ferrous sheet faced with an aluminum base alloy containing magnesium. Moreover, the intermediate layer is joined to both the ferrous sheet and the layer of magnesium-containing aluminum base alloy by a strong, ductile, workable bond.

The invention has been described above in terms of bonding a magnesium-containing aluminum alloy to one side of ferrous sheet by means of a magnesium-free aluminum interlayer. However, it can also be employed to face both sides of the ferrous sheet with magnesium-containing aluminum alloys, by bonding to both sides of ferrous sheet a laminate composed of a layer of a magnesium-containing aluminum base alloy, and a layer of magnesium-free aluminum.

Likewise, the invention can be used to produce a laminate consisting of a layer of a wrought aluminum base alloy containing 0.4–10% of magnesium, with a facing of ferrous sheet bonded to both sides thereof by an intermediate layer of magnesium-free aluminum.

The improved strength of bond which is obtained by use of a magnesium-free aluminum interlayer between ferrous sheet and aluminum alloys containing magnesium is illustrated by the following tests:

Duplex sheet, 0.110 inch thick, was produced by hot-rolling sheet of commercial aluminum which contained 99.75% of aluminum and no magnesium, to No. 3004 aluminum alloy sheet. In the resultant duplex sheet the layer of commercial, magnesium-free aluminum was 0.005 inch thick. The duplex sheet was annealed to the 0 temper. The magnesium-free alloy layer of the duplex sheet, and one side of uncoated No. 3004 aluminum alloy sheet, 0.110 inch thick, were each scratch-brushed, after which on each of the scratch-brush surfaces was laid No. 302 (American Iron and Steel designation) annealed stainless steel sheet, 0.01 inch thick, which had been etched lightly. Some of the stainless steel-aluminous sheet composites were heated at 800° F. for ten minutes, and others were heated at 800° F. for thirty minutes. All of them were hot-rolled at 800° F. to a thickness of 0.012 inch in a single pass through the rolls. In the case of the composites in which the stainless steel sheet was in direct contact with the No. 3004 aluminum alloy sheet, the hot rolling effected an average elongation of the stainless steel sheet of 12%; in the case of the composites having a commercial aluminum interlayer between the stainless steel and the No. 3004 aluminum alloy the average elongation effected in the stainless steel was 7%.

One-inch wide strips were cut from the laminates so produced. The strength of the bond between the stainless steel layer and the aluminous layer of those strips was tested by measuring the number of pounds of force required to pull the stainless steel layer from the aluminous layer by identical procedures. For the laminated strips composed of a layer of No. 3004 aluminum alloy bonded directly to stainless steel, the average number of pounds of force required to separate the stainless steel from the aluminous layer in the case of the strips which had been heated at 800° F. for ten minutes was three pounds, and in the case of those which had been heated at 800° F. for thirty minutes was too low to be measured. For the laminated strips having a layer of commercial aluminum intermediate the stainless steel and the No. 3004 aluminum alloy, the average was 21 pounds in the case of the strips which had been heated at 800° F. for ten minutes, and was 15 pounds in the case of the strips which had been heated at 800° F. for thirty minutes.

We claim:

1. The method of producing a laminate consisting of a layer of ferrous sheet faced with an aluminum base alloy containing at least 85% of aluminum and between 0.4 and 10% of magnesium as an essential added element, which magnesium impairs the bondability of said aluminum base alloy directly to said ferrous sheet by hot rolling, comprising the steps of assembling a composite consisting of a layer of ferrous sheet and a wrought laminate consisting of a layer of the said aluminum base alloy and a layer of magnesium-free aluminum, containing substantially less than 0.5% silicon, the said layer of magnesium-free aluminum being intermediate the said ferrous sheet and the said aluminum base alloy layer, and hot rolling the said composite at 600 to 900° F. under sufficient roll pressure to bond the said magnesium-free aluminum layer to the said ferrous sheet.

2. The method in accordance with claim 1, in which the said layer of magnesium-free aluminum of the said wrought laminate contains at least 99.75% aluminum.

3. The method in accordance with claim 1, in which the said layer of magnesium-free aluminum of the said wrought laminate has an elongation greater than that of the said layer of aluminum base alloy of the wrought laminate.

4. The method in accordance with claim 2 in which the said layer of magnesium-free aluminum of the sheet wrought laminate has an elongation greater than that of the said layer of aluminum base alloy of the wrought laminate.

References Cited

UNITED STATES PATENTS

| | | | |
|---|---|---|---|
| 2,726,436 | 12/1955 | Champion | 29—197.5 |
| 2,937,435 | 5/1960 | Brenner | 29—504 X |
| 2,995,808 | 8/1961 | Weisse | 29—197.5 X |
| 3,132,418 | 5/1964 | Fulford | 29—471.1 |
| 3,173,202 | 3/1965 | Farber | 29—196.2 X |

JOHN F. CAMPBELL, *Primary Examiner.*

R. F. DROPKIN, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,400,450  
September 10, 1968

Joseph A. Nock, Jr., et al.

It is certified that error appears in the above identified patent and that said Letters Patent are hereby corrected as shown below:

Column 1, line 40, "2,171,404" should read -- 2,171,040 --. Column 2, line 18, "is" should read -- be --. Column 3, line 52, "brush" should read -- brushed --; line 59, "0.012" should read -- 0.102 --.

Signed and sealed this 11th day of November 1969.

(SEAL)  
Attest:

Edward M. Fletcher, Jr.  
Attesting Officer

WILLIAM E. SCHUYLER, JR.  
Commissioner of Patents